(12) United States Patent
Uozumi et al.

(10) Patent No.: US 8,166,848 B2
(45) Date of Patent: May 1, 2012

(54) TRANSMISSION CASE

(75) Inventors: Shingo Uozumi, Nishio (JP); Nobukazu Ike, Kariya (JP); Takeshi Fukuma, Nishio (JP); Masataka Kameyama, Nishio (JP); Ryota Sato, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 380 days.

(21) Appl. No.: 12/382,048

(22) Filed: Mar. 6, 2009

(65) Prior Publication Data
US 2009/0241727 A1 Oct. 1, 2009

(30) Foreign Application Priority Data

Mar. 31, 2008 (JP) ................................. 2008-093358

(51) Int. Cl.
F16H 57/02 (2006.01)
(52) U.S. Cl. ...................................................... 74/606 R
(58) Field of Classification Search ................. 74/606 R
See application file for complete search history.

(56) References Cited

U.S. PATENT DOCUMENTS

| 4,506,561 | A * | 3/1985 | Hayakawa ................... 74/606 R |
| 6,073,517 | A * | 6/2000 | Pauwels et al. ............. 74/606 R |
| 6,729,206 | B2 * | 5/2004 | Hayabuchi et al. ......... 74/606 R |
| 7,444,901 | B2 * | 11/2008 | Okuno et al. ............... 74/606 R |
| 2002/0017159 | A1 | 2/2002 | Hayabuchi et al. |
| 2004/0031352 | A1 | 2/2004 | Okuno et al. |

FOREIGN PATENT DOCUMENTS

| JP | A-3-249335 | 11/1991 |
| JP | A-7-246850 | 9/1995 |
| JP | A-8-25990 | 1/1996 |
| JP | A-2002-54723 | 2/2002 |
| JP | A-2003-336727 | 11/2003 |
| WO | WO 2006104916 A2 * | 10/2006 |

* cited by examiner

Primary Examiner — Vicky Johnson
(74) Attorney, Agent, or Firm — Oliff & Berridge, PLC

(57) ABSTRACT

A transmission case includes a housing that accommodates a starting device, the housing having rib portions on an inner surface; and a speed change mechanism case connected to the housing, the speed change mechanism case accommodating a speed change mechanism, wherein a thin wall portion is provided in the housing by a groove formed in the housing, and the transmission case is structured such that stress is concentrated on the thin wall portion by at least one of the rib portions when an impact load is applied to the transmission case.

8 Claims, 4 Drawing Sheets

TRANSMISSION CASE

CROSS-REFERENCE TO RELATED APPLICATION

The disclosure of Japanese Patent Application No. 2008-093358 filed on Mar. 31, 2008 including the specification, drawings and abstract is incorporated herein by reference in its entirety.

BACKGROUND

The present invention generally relates to a transmission case.

In general, an automatic transmission mounted on, for example, a vehicle is structured by a hydraulic transmission apparatus such as a torque converter as a starting device, and a speed change mechanism formed by a gear mechanism such as planetary gears, a hydraulic clutch, and a hydraulic brake. The hydraulic transmission apparatus and the speed change mechanism are accommodated in a converter housing and a speed change mechanism case, respectively.

Automatic transmission fluid (ATF) is dispersed and circulated in the speed change mechanism case in order to lubricate and cool each portion of the speed change mechanism. The inside of the speed change mechanism case is therefore a space that is oil-tight to the outside of the speed change mechanism case. The converter housing, on the other hand, is a structural member that covers the outside of the hydraulic transmission apparatus and connects the automatic transmission to an engine. The space in the speed change mechanism case and the space in the converter housing are normally separated from each other, and a pump body of an oil pump as a hydraulic source for hydraulically controlling and lubricating each portion serves as a partition wall.

As a transmission case formed by the above-described speed change mechanism case and converter housing, a transmission case that prevents breakage of the speed change mechanism case and thus prevents oil leakage in a case where an offset impact load is applied to the transmission case mounted on, for example, an FR (front engine, rear drive) vehicle (such that the axial direction of an automatic transmission becomes parallel to the forward traveling direction of the vehicle) has been proposed (see Japanese Patent Application Publication No. JP-A-2003-336727).

In this transmission case, a slit (through hole) serving as a stress concentration portion is formed in the converter housing. In the case where an offset impact load is applied to the above-described so-called longitudinally-mounted automatic transmission, a broken part is limited to the converter housing, whereby breakage of the speed change mechanism case is prevented and oil leakage is prevented.

SUMMARY

The transmission case described in Japanese Patent Application Publication No. JP-A-2003-336727 has a slit in the converter housing, and foreign matters and rainwater may enter the transmission case through the slit. Therefore, this transmission case uses a shield member for covering the slit. However, the shield member needs to be a member that can be easily attached without degrading the function as a stress concentration portion when an impact load is applied. The shield member is therefore made of a material different from that of the converter housing, which complicates the manufacturing process of the transmission case and increases the cost.

It is therefore an object of the present invention to provide a transmission case capable of obtaining sufficient stress concentration when an impact load is applied, while reducing cost by eliminating the need to form a slit in a housing. The present invention can also achieve various other advantages.

According to an exemplary aspect of the invention, a transmission case includes a housing that accommodates a starting device, the housing having rib portions on an inner surface; and a speed change mechanism case connected to the housing, the speed change mechanism case accommodating a speed change mechanism, wherein a thin wall portion is provided in the housing by a groove formed in the housing, and the transmission case is structured such that stress is concentrated on the thin wall portion by at least one of the rib portions when an impact load is applied to the transmission case.

BRIEF DESCRIPTION OF THE DRAWINGS

Various exemplary aspects of the invention will be described with reference to the drawings, wherein.

DETAILED DESCRIPTION OF EMBODIMENTS

Hereinafter, an embodiment of the present invention will be described with reference to FIGS. 1 to 4.

Figure 1:
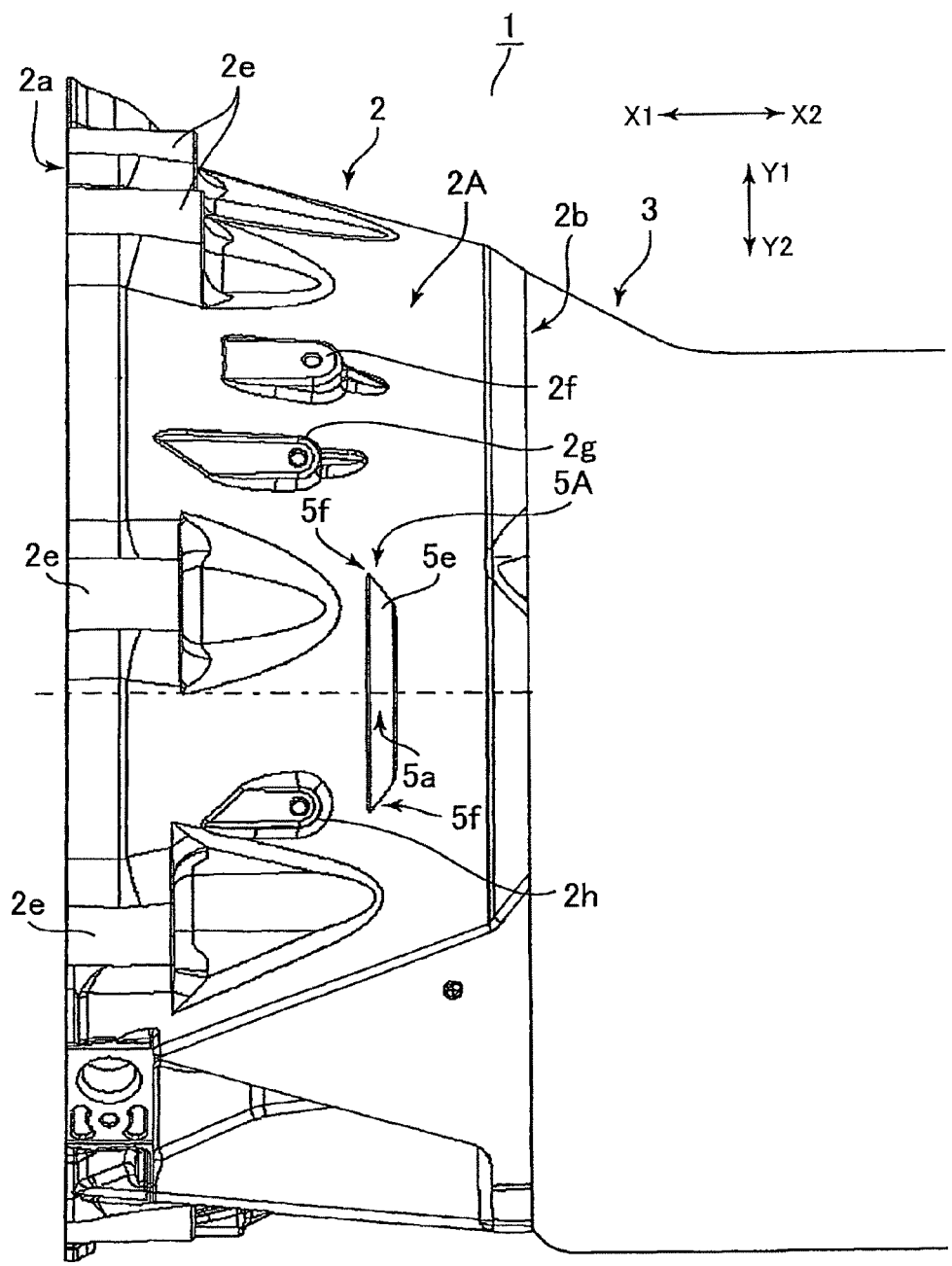
FIG. 1 is a side view showing a converter housing according to the present invention.
Figure 2:
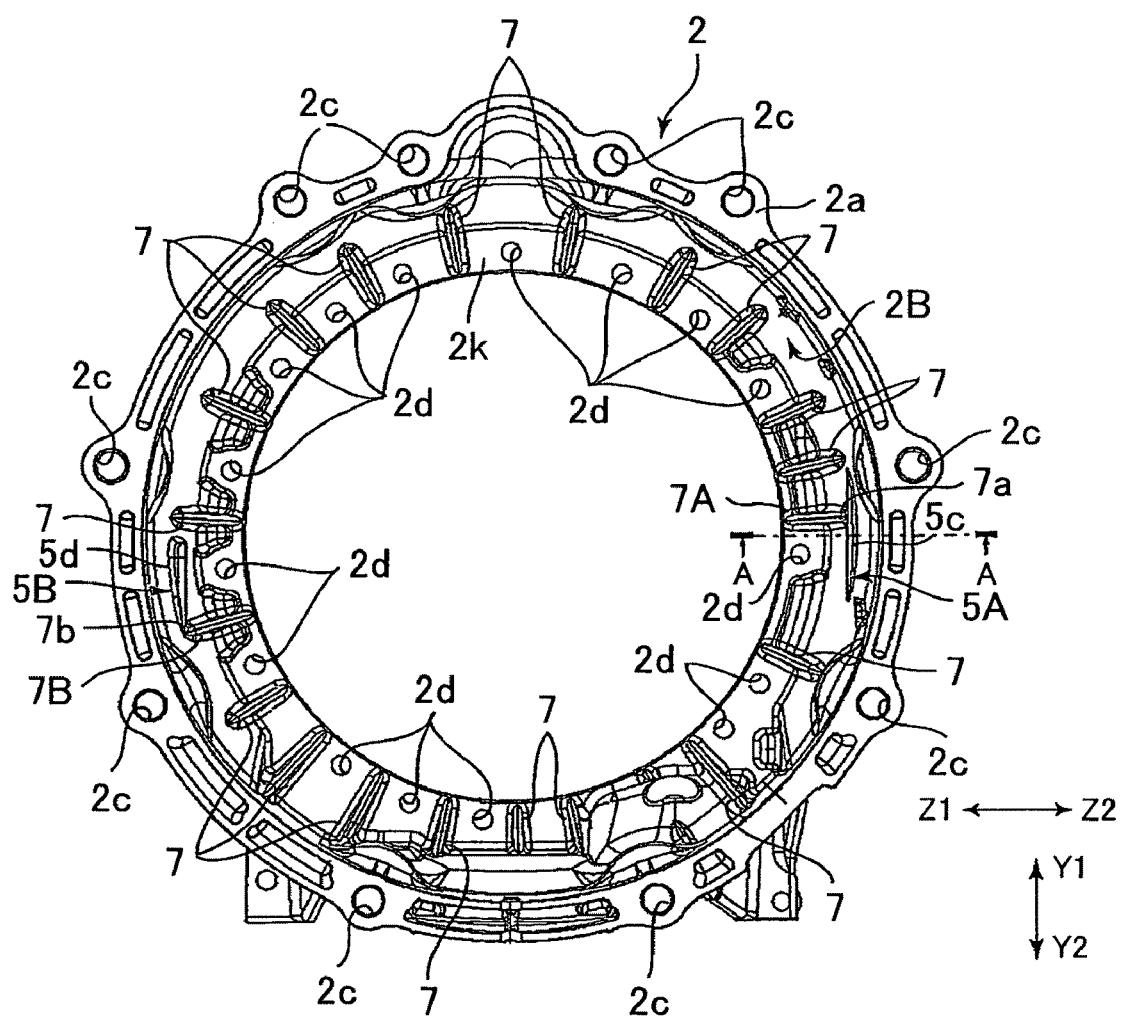
FIG. 2 is a front view showing the converter housing according to the present invention.
Figure 3:
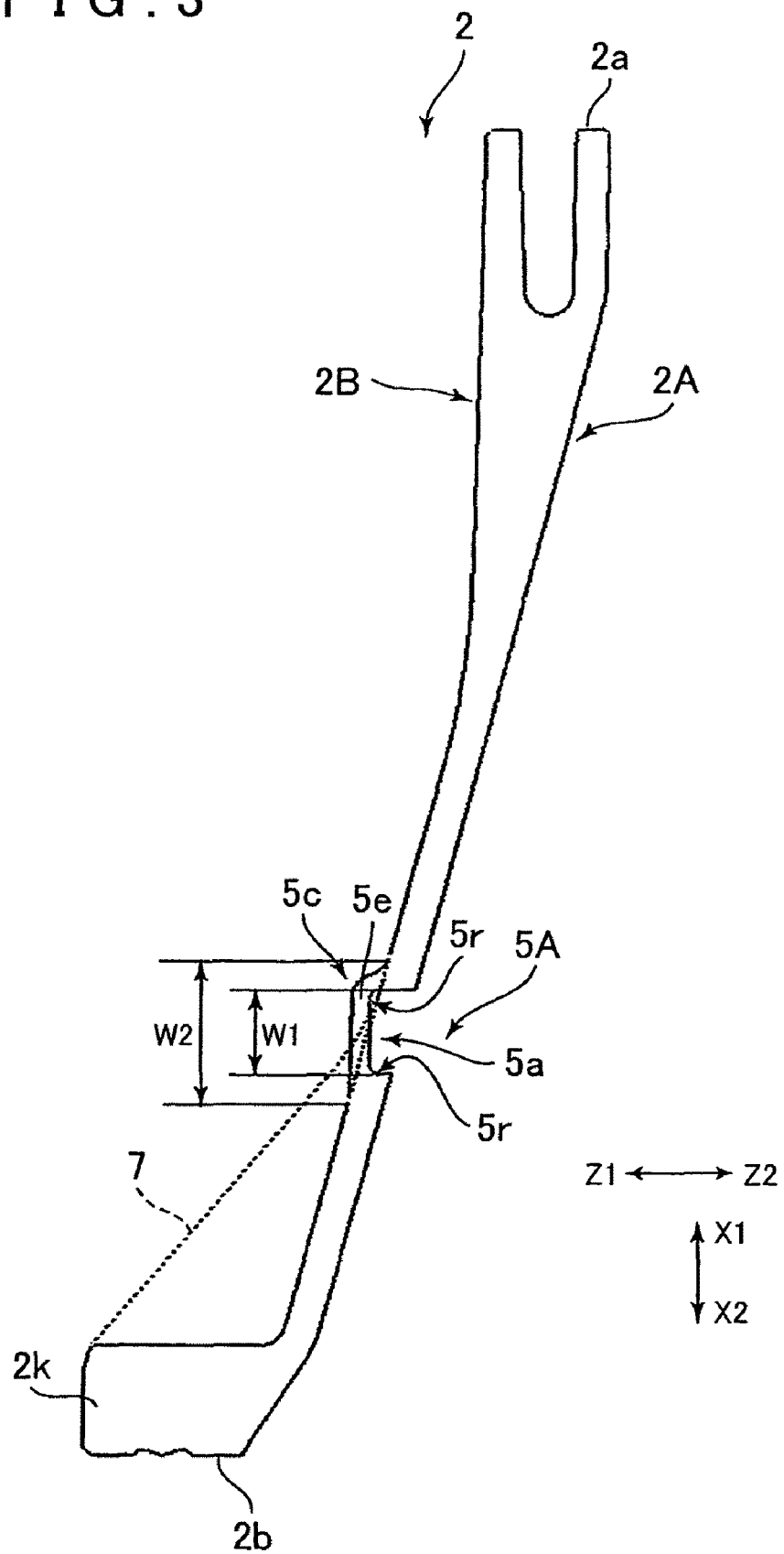
FIG. 3 is a cross-sectional view taken along line A-A in FIG. 2.

First, a schematic structure of a transmission case 1 to which the present invention can be applied will be described with reference to FIG. 1. As shown in FIG. 1, the transmission case 1 that is preferably used in, for example, a FR-type (front engine, rear drive) vehicle includes a converter housing (housing) 2 and a speed change mechanism case 3. The converter housing 2 accommodates a not-shown hydraulic transmission apparatus as a starting device which includes a lock-up clutch and a torque converter. The speed change mechanism case 3 accommodates a not-shown speed change mechanism which is formed by a gear mechanism such as planetary gears and a speed change mechanism formed by a hydraulic clutch and a hydraulic brake. Note that, in the description of the present embodiment, the transmission case 1 is mounted on an FR-type vehicle. Therefore, the axial direction of the speed change mechanism (i.e., the longitudinal direction of the vehicle) is defined as X1-X2 direction as shown in FIGS. 1 and 3, the vertical direction in FIG. 1 (i.e., the vertical direction of the vehicle) is defined as Y1-Y2 direction shown in FIGS. 1 and 2, and the lateral direction in FIG. 2 (i.e., the lateral direction of the vehicle) is defined as Z1-Z2 direction shown in FIGS. 2 and 3.

As shown in FIG. 1, the converter housing 2 has a hollow, generally bowl shape of a substantially uniform thickness which is open with a large diameter in X1 direction (engine connection direction) and is open with a small diameter in X2 direction so as to surround the whole circumference of the hydraulic transmission apparatus. The large-diameter opening portion is an engine connecting portion 2a for connecting with an engine. The engine connecting portion 2a includes a plurality of fastening portions 2e having bolt holes 2c (see FIG. 2). The converter housing 2 and the engine are thus fixed to each other by fastening with a plurality of bolts (not shown).

The small-diameter opening portion is a speed change mechanism case connecting portion 2b for connecting with the speed change mechanism case 3. As shown in FIG. 2, the speed change mechanism case connecting portion 2b has a plurality of bolt holes 2d in a flange portion 2k formed so as to project to the inner periphery side. The converter housing 2 and the speed change mechanism case 3 are thus fixed to each other by fastening with a plurality of bolts (not shown). Moreover, a pump body of a not-shown oil pump is disposed between the converter housing 2 and the speed change mechanism case 3. The pump body separates the internal space of the converter housing 2 from the oil-tight internal space of the speed change mechanism case 3.

The converter housing 2 has the plurality of fastening portions 2e, mount portions 2f, 2g, 2h for connecting with corresponding portions when mounted on the vehicle, and the like on an outer surface 2A thereof. The converter housing 2 has raised portions 5c, 5d which will be described later, a plurality of rib portions 7, and the like on an inner surface 2B thereof.

As shown in FIGS. 2 and 3, the rib portions 7 extend from the inner peripheral end of the flange portion 2k to the outer periphery side of the flange portion 2k and in contact with the inner surface 2B of the converter housing 2. Each rib portion 7 is formed in a substantially triangle flat plate shape. The plurality of rib portions 7 are arranged in the circumferential direction such that the distribution of the rib portions 7 is not extremely uneven. The rib portions 7 are formed so as to extend in X1 direction along the inner surface 2B of the bowl-shaped converter housing 2 and to extend from the inner peripheral end of the flange portion 2k to the outer periphery side thereof in a normal direction. In other words, the rib portions 7 are arranged so as to extend from the speed change mechanism case connecting portion 2b having the flange portion 2k toward the engine connection direction (X1 direction) in a radial pattern. Of the plurality of rib portions 7, a rib portion 7A provided on the Z2 direction side (on the right-hand side in FIG. 2) and a rib portion 7B provided on the Z1 direction side (on the left-hand side in FIG. 2) are arranged so that their respective ends 7a, 7b on the X1 direction side (on the outer periphery side) respectively overlap the raised portions 5c, 5d which will be described later. Note that the length of the rib portion 7 in X1-X2 direction is set in view of the shape of the inner surface 2B of the converter housing 2, the distance to an adjacent rib portion 7, the load that is applied to the converter housing 2 in a normal state, and the like. The portion shown by dashed line in FIG. 3 indicates the rib portion 7 having an average length.

Grooves 5A, 5B serving as a main part of the present invention will now be described with reference to FIGS. 1 to 3. The groove 5A and the groove 5B are provided at both ends of the converter housing 2 in Z1-Z2 direction, and arranged in a substantially middle portion in Y1-Y2 direction in order to effectively cause stress concentration regardless of whether an impact load that is offset to the right or offset to the left is applied.

The groove 5A is provided in an intermediate portion in X1-X2 direction on the Z2-direction side of the converter housing 2, and extends perpendicularly to the axial direction (in Y1-Y2 direction) and in the circumferential direction. As shown in FIG. 3, the groove 5A is formed by a recess 5a, a thin wall portion 5e, and the raised portion 5c. The recess 5a is formed in the outer surface 2A of the converter housing 2 so as to have a U-shaped cross-section. The thin wall portion 5e that is thinner than the other part of the converter housing 2 is formed by forming the recess 5a. The raised portion 5c is raised from the inner surface 2B of the recess 5a on the inner surface 2B side of the recess 5a.

Figure 4:
FIG. 4 is a diagram showing the relation between the radius of curvature of an R-shape of each corner and the stress value.

The recess 5a has corners 5r, and the corners 5r are formed in an R-shape. The stress value that is generated in the groove 5A can be varied by changing the radius of curvature of the R-shape. More specifically, as shown in FIG. 4, in the case of RIGHT offset, the stress value is around S6 when the radius of curvature of each of the corners 5r is R1 (e.g., 0). The stress value is between S4 and S5 when the radius of curvature is R2 (e.g., R0.5), and is between S3 and S4 when the radius of curvature is R3 (e.g., R1.0). The stress value is around S3 when the radius of curvature is R4 (e.g., R1.5), and is between S2 and S3 when the radius of curvature is R5 (e.g., R2.0). The stress value is thus reduced by increasing the radius of curvature of each of the corners 5r. Note that, in FIG. 4, C indicates a stress value obtained when merely a slit (through hole) was provided, and this stress value is around S2. In other words, by providing the groove 5A, a stress value to be generated can be adjusted by changing the radius of curvature of each of the corners 5r, and the stress value can be adjusted in a range larger than the stress value obtained when the slit is provided.

As shown in FIG. 1, the recess 5a is linearly formed in a linear manner in the bowl-shaped converter housing 2 so that the recess 5a has a trapezoidal groove shape, and acute angled portions 5f are formed at the longitudinal ends on the X1-direction side. The acute angled portions 5f have an acute angle shape where stress concentration is likely to occur. A stress can therefore be effectively concentrated on the acute angled portions 5f when an impact load is applied.

As shown in FIG. 3, the thin wall portion 5e is a portion that is left after the recess 5a is cut from the converter housing 2. As described above, the thin wall portion 5e is formed to be thinner than the other part of the converter housing 2 so that a stress is likely to be concentrated on the thin wall portion 5e. The raised portion 5c is a portion that is raised on the inner surface 2B side of the converter housing 2 by forming the groove 5A. The X1-direction-side end 7a of the rib portion 7A is formed in the raised portion 5c. The raised portion 5c is formed in the range shown by W2. By forming the X1-direction-side ends of the rib portions 7 in the range shown by W2, the rib portions 7 can cause a large stress to be concentrated on the thin wall portion 5e of the groove 5A when an impact load is applied. Preferably, the X1-direction-side ends of the rib portions 7 are formed so as to overlap the range shown by W1 in the width direction of the recess 5a of the groove 5A. In this case, the rib portions 7 can cause a larger stress to be concentrated on the thin wall portion 5e of the groove 5A when an impact load is applied.

As shown in FIG. 2, the groove 5A is provided so as to cross the rib portion 7A substantially perpendicularly in an intermediate portion in the longitudinal direction (Y1-Y2 direction). Accordingly, the rib portion 7A can effectively cause a stress to be concentrated on the thin wall portion 5e of the groove 5A even when an impact load is applied.

The groove 5B is provided in an intermediate portion in X1-X2 direction on the Z1-direction side of the converter housing 2. The groove 5B extends perpendicularly to the axial direction (in Y1-Y2 direction) and in the circumferential direction. The X1-direction-side end 7b of the rib portion 7B is formed in a Y2-direction-side end of the raised portion 5d of the groove 5B in the longitudinal direction (Y1-Y2 direction). Accordingly, even when an impact load is applied, the rib portion 7B can cause a large stress to be concentrated on the longitudinal end of the groove 5B where stress concentration is likely to occur. Note that the groove 5B has substantially the same structure as that of the groove 5A except that the groove 5B is formed to be shorter than the groove 5A in the longitudinal direction (Y1-Y2 direction). Description of the groove 5B is therefore omitted.

When the grooves 5A, 5B described above are manufactured, the converter housing 2 is first manufactured by casting. The converter housing 2 is manufactured such that the raised portions 5c, 5d are formed in advance on the inner surface 2B side of the converter housing 2. After that, while moving the converter housing 2 in Y1-Y2 direction and aligning the position of the raised portion 5c, a cutting process is performed in a linear manner so as to leave the corners 5r on the outer surface 2A side of the converter housing 2, whereby the groove 5A is formed. The raised portion 5d side of the converter housing 2 is similarly cut to form the groove 5B. Note that in the case where the grooves 5A, 5B are manufactured in this way, the wall thickness of the thin wall portion 5e and the longitudinal length of the grooves 5A, 5B can be set by adjusting the cutting depth in the cutting process of the raised portions 5c, 5d.

As described above, in the transmission case 1 of the present embodiment, a stress is concentrated on the thin wall portion 5e of the converter housing 2 by the rib portions 7A, 7B when an impact load is applied to the transmission case 1. Stress concentration can therefore be sufficiently generated without forming a through hole. Accordingly, the converter housing 2 can be appropriately broken even when an impact load is applied. At the same time, since the need for the processes of manufacturing and attaching a shield member can be eliminated, the manufacturing process can be simplified and the cost can be reduced as compared to, for example, the case where a slit is formed in the converter housing 2 and a shield member for covering the slit is provided.

Moreover, the grooves 5A, 5B are respectively provided at the X1-direction-side ends 7a, 7b of the rib portions 7A, 7B. Accordingly, even when an impact load is applied, a stress can be concentrated on the grooves 5A, 5B by the X1-direction-side ends 7a, 7b of the existing rib portions 7 provided in the converter housing 2. Therefore, the cost can be reduced as compared to, for example, the case where a member for causing a stress to be concentrated on the grooves 5A, 5B when an impact load is applied is newly provided.

Moreover, the X1-direction-side ends 7a, 7b of the rib portions 7A, 7B are provided so as to overlap the grooves 5A, 5B in X1-X2 direction. Therefore, the X1-direction-side ends 7a, 7b of the rib portions 7A, 7B can be provided close to the grooves 5A, 5B, whereby a stress can be effectively concentrated when an impact load is applied.

Moreover, the X1-direction-side end 7b of the rib portion 7B is provided at a longitudinal end of the groove 5B. Since the X1-direction-side end 7b of the rib portion 7B can be provided at the longitudinal end of the groove 5B where stress concentration is likely to occur, a stress can be effectively concentrated when an impact load is applied.

Moreover, the rib portion 7A perpendicularly crosses a part of a longitudinal intermediate portion of the groove 5A. The rib portion 7A can thus be provided so as to cross the groove at such an angle that is likely to cause stress concentration. Accordingly, a stress can be effectively concentrated when an impact load is applied.

Moreover, the grooves 5A, 5B are formed at both ends of the converter housing 2 in Z1-Z2 direction. Accordingly, a stress can be effectively concentrated regardless of whether an impact load that is offset to the right or offset to the left is applied.

Moreover, the grooves 5A, 5B have a U-shaped cross section and the corners 5r have an R-shape. The stress value that is generated in the grooves 5A, 5B is varied by changing the radius of curvature of the R-shape of each of the corners 5r. Accordingly, an appropriate stress can be generated in the grooves by adjusting the radius of curvature of the R shape.

Moreover, the grooves are formed by linearly cutting the outer surface 2A of the converter housing 2 having the raised portion 5c on the inner surface 2B side so as to be perpendicular to X1-X2 direction. Since the groove 5A can be formed only by a cutting process, the manufacturing process can be simplified and the cost can be reduced as compared to, for example, the case where a shield member for covering a slit is provided.

Moreover, the grooves have a trapezoidal shape by linearly cutting the bowl-shaped converter housing 2. Since the acute angle portions 5f can thus be formed on both longitudinal ends on the X1 direction side, a stress can be effectively concentrated when an impact load is applied.

Note that the transmission case 1 of the present embodiment described above is described as the transmission case 1 for an automatic transmission for use in an FR-type vehicle. However, the transmission case 1 of the present embodiment may be, for example, a transmission case for a manual transmission that accommodates in a housing a dry clutch for starting. The present invention is applicable to any transmission case as long as the transmission case includes a housing.

The transmission case according to the present invention can be used for a transmission that is mounted on a vehicle such as a passenger car, a truck, a bus, and an agricultural machine, and the like. Especially, the transmission case according to the present invention is preferably used as a transmission case having a portion where a stress is concentrated when an impact load is applied to a housing. For example, the transmission case according to the present invention is suitable as a transmission case for which cost reduction is required by eliminating the need to form a slit in the housing.

According to an exemplary aspect of the invention, a stress is concentrated on the thin wall portion of the converter housing by the rib portion when an impact load is applied to the transmission case. Stress concentration can therefore be sufficiently generated without forming a through hole. Accordingly, the housing can be appropriately broken even when an impact load is applied. At the same time, since the need for the processes of manufacturing and attaching a shield member can be eliminated, the manufacturing process can be simplified and the cost can be reduced as compared to, for example, the case where a slit is formed in the housing and a shield member for covering the slit is provided.

According to an exemplary aspect of the invention, the groove is provided at the engine-connection-direction-side end of at least one of the rib portions. Accordingly, even when an impact load is applied, a stress can be concentrated on the groove by the engine-connection-direction-side end of the existing rib portion provided in the converter housing. Therefore, the cost can be reduced as compared to, for example, the case where a member for causing a stress to be concentrated on the groove when an impact load is applied is newly provided.

According to an exemplary aspect of the invention, the engine-connection-direction-side end of the rib portion is provided so as to overlap the groove in the axial direction of the transmission case. Therefore, the engine-connection-direction-side end of the rib portion can be provided close to the groove, whereby a stress can be effectively concentrated when an impact load is applied.

According to an exemplary aspect of the invention, the engine-connection-direction-side end of the rib portion is provided at at least one of the longitudinal ends of the groove. Since the engine-connection-direction-side end of the rib portion can be provided at the longitudinal end of the groove where stress concentration is likely to occur, a stress can be effectively concentrated when an impact load is applied.

According to an exemplary aspect of the invention, at least one of the rib portions perpendicularly crosses a part of the longitudinal intermediate portion of the groove. The rib portion can thus be provided so as to cross the groove at such an angle that is likely to cause stress concentration. Accordingly, a stress can be effectively concentrated when an impact load is applied.

According to an exemplary aspect of the invention, the groove is formed on both sides of the housing. Accordingly, a stress can be effectively concentrated regardless of whether an impact load that is offset to the right or offset to the left is applied.

According to an exemplary aspect of the invention, the groove has a U-shaped cross section and the corners have an R-shape. The stress value that is generated in the groove is varied by changing the radius of curvature of the R-shape of each of the corners. Accordingly, an appropriate stress can be generated in the groove by adjusting the radius of curvature of the R shape.

According to an exemplary aspect of the invention, the groove is formed by linearly cutting the outer surface of the housing having the raised portion on the inner surface side so as to be perpendicular to the axial direction. Since the groove can be formed only by a cutting process, the manufacturing process can be simplified and the cost can be reduced as compared to, for example, the case where a shield member for covering a slit is provided.

Moreover, the groove has a trapezoidal shape by linearly cutting the bowl-shaped housing. Since acute angle portions can thus be formed on both longitudinal ends on the engine-connection-direction side, a stress can be effectively concentrated when an impact load is applied.

What is claimed is:

1. A transmission case, comprising:
   a housing that accommodates a starting device, the housing having rib portions on an inner surface; and
   a speed change mechanism case connected to the housing, the speed change mechanism case accommodating a speed change mechanism, wherein:
   a wall portion is provided in the housing and is formed so as to be thinner than other parts of the housing because of a groove formed in the housing,
   the wall portion is solid, and
   the transmission case is structured such that stress is concentrated on the wall portion by at least one of the rib portions when an impact load is applied to the transmission case.

2. The transmission case according to claim 1, wherein:
   the rib portions extend in a radial pattern from a connecting portion of the housing with the speed change mechanism case toward an engine connection direction,
   the groove has a predetermined length extending in an orthogonal direction with respect to the rib portions, and
   the groove is provided in an engine-connection-direction-side end of at least one of the rib portions.

3. The transmission case according to claim 2, wherein the engine-connection-direction-side end of the at least one of the rib portions is provided so as to overlap the groove in an axial direction of the transmission case.

4. The transmission case according to claim 3, wherein:
   a raised portion is formed in the inner surface of the housing, and the groove is formed on an outer surface of the housing in the raised portion, and the groove is formed by linearly cutting the outer surface of the housing in a bowl shape so as to be perpendicular to the axial direction.

5. The transmission case according to claim 2, wherein the engine-connection-direction-side end of the at least one of the rib portions is provided at least one longitudinal end of the groove.

6. The transmission case according to claim 2, wherein at least one of the rib portions perpendicularly crosses a part of a longitudinal intermediate portion of the groove.

7. The transmission case according to claim 2, wherein the groove is formed on both sides of the housing.

8. The transmission case according to claim 2, wherein the groove has a U-shaped cross section and R-shaped corners.

* * * * *